Figure 1:
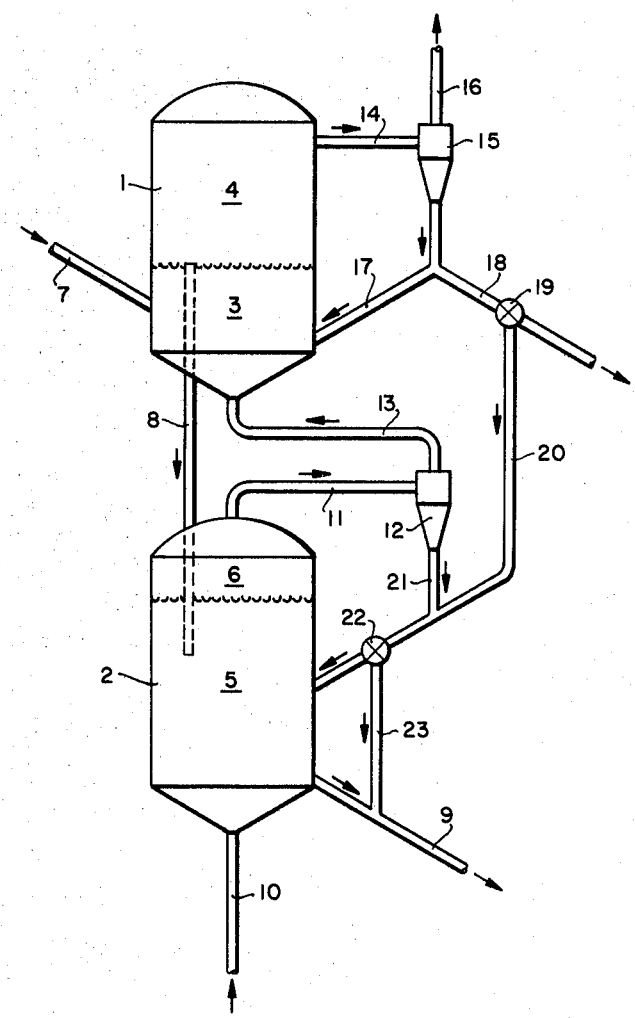

May 17, 1966 F. X. MAYER ETAL 3,251,678
FLUID BED PROCESS
Filed Nov. 25, 1964 2 Sheets-Sheet 1

United States Patent Office 3,251,678
Patented May 17, 1966

3,251,678
FLUID BED PROCESS
Francis Xavier Mayer, Jesse Matteau Carr, Jr., and John Frederick Moser, Jr., all of Baton Rouge, La., assignors to Esso Research and Engineering Company, a corporation of Delaware
Filed Nov. 25, 1964, Ser. No. 412,241
15 Claims. (Cl. 75—26)

This is a continuation-in-part of U.S. application S.N. 274,234 filed April 19, 1963, now abandoned.

This invention relates to a method for the production of sponge iron in fluidized bed reactions wherein oxidic iron ores are directly contacted with reducing gases. In particular, it relates to an improved method wherein fluidized oxidic iron ores are metallized by direct counter-current contact with hydrogen, carbon monoxide, or mixtures of these and other gases.

It has been long known to contact particulate solids with ascending gases to fluidize the solids and form fluidized beds for carrying out chemical reactions. In a fluidized bed the velocity of the upwardly flowing gas is correlated with the particle size and density of the solids to suspend the latter in a dense turbulent state simulating a boiling liquid. The solids particles undergo extensive vertical and horizontal motion but nonetheless assume a pseudo liquid level. Such processes, inter alia, assure better heat transfer and improve process efficiency. In present commercial processes, fluidized beds are provided wherein the solids particles are of substantially uniform particle size distribution. In such reactions, relatively little change of particle size takes place during the operation and, to the extent that fines are produced, these are removed from the process. Such processes generally have operated quite successfully.

The art also discloses fluidized processes relating specifically to the production of sponge iron by reduction of oxidic iron ores, i.e., ores consisting essentially of oxides of iron. In such processes, particulate oxidic ores at elevated temperatures are also fluidized by contact with ascending gases and reduced. The process may provide a single fluidized bed or a plurality of fluidized beds, and in the latter case the beds are staged as separate reduction zones. During the reduction, particularly when the degree of metallization becomes high, the particles undergo changes in size and shape, including some growth by agglomeration of small particles into larger particles, but primarily there is a net decrease in particle size due to decrepitation. The very small paritcles or fines produced can only accumulate to a limited extent since they are gradually lost in the effluent evolved from the process.

In the most advanced of the fluidized iron ore reduction processes, though to present knowledge none has been commercialized, the reduction zones are staged, since staging offers certain advantages. In such processes the particulate oxidic iron ore being treated is flowed downwardly from one zone to the next and contacted in the separate zones by an ascending gas, or gases. In each succeeding zone, the ore is reduced to a lower state of oxidation. Thus, in a first zone, or zones, the oxides are reduced from the ferric state to magnetic oxide of iron. In a succeeding zone, or zones, the magnetic oxide of iron is reduced to ferrous oxide. In yet another succeeding zone, or zones, the ferrous oxide is reduced to metallic iron. The different stages are generally operated at different elevated temperatures, and certain advantages are offered wherein the temperature is maintained at a higher level in the zones of highest metallization. Fluidized iron ore reduction processes, as contrasted with fluidized processes in general, offer unique and difficult problems, particularly where the process is staged.

In an iron ore reduction process, especially a staged process, it is, inter alia, extremely difficult to maintain proper fluidization of the ore. This difficulty arises as a result of a phenomenon known as bogging. It is characterized by a loss of fluidization in the fluidized beds and appears to be caused by a "stickiness" occurring upon the surfaces of the individual iron ore solids particles. The stickiness tends to produce adherence between individual particles and hence produces agglomeration.

While applicants have no desire to be bound by any theory on mechanism, it is believed that the individual particle surfaces of the ore become covered, wholly or partially, with crystalline forms of iron. These crystalline forms, microscopic in character, take on the appearance of nodules or "whiskers" extending outwardly from the surfaces of the individual particles. Such projections produce locations for attachment upon contact one particle with another so that the individual iron ore particles cling together to produce aggregates or agglomerates. The formation of these sites becomes more pronounced as reduction proceeds. This phenomenon is much like sintering of the particles in its effect but it occurs at an even lower temperature, i.e., below about 1800° F. Sintering, however, is caused by an actual melting of the reduced iron upon the surfaces of the particles, this causing the individual particles to stick or weld together upon contact one with another to produce agglomeration.

Bogging, or the tendency of the process to bog, produces a host of problems and militates against attempts to provide a more efficient fluidized iron ore reduction process. Providing a staging of the reduction zones or increased temperatures would thus normally be considered very desirable inasmuch as process efficiency should be improved. This is only true to a degree, however, because increasing temperature and increased metallization increases the tendency of the process toward bogging. The problem is particularly acute in a ferrous reduction zone, or zones, especially in the advanced metallization stages of reduction wherein the age distribution of the particles is narrow, i.e., where the sum total of the particles have remained within the zone for a short period of time. Thus, where the age distribution of the particles is narrow, there are relatively few particles of higher oxidation to dilute the surface effects and hence the number of particles possessing relatively high nodular growths are in more intimate contact. The problem becomes particularly acute in the ferrous reduction stages, particularly as the degree of metallization increases. Also, the operation of such process is especially troublesome when hydrogen, or mixtures of gases containing hydrogen, is employed as a reducing gas.

The bogging tendency in reducing fluidized iron ores also appears to militate against other normally acceptable prior art practices which relate to the processing of fluidized solids systems generally. For example, it would normally be expected from present commercial fluidized solids process that solids particles of a high uniformity of small particle sizes would offer advantages in processing. It may be expected that this technique would improve process efficiency. Thus, one would expect chemical reaction rate to increase and higher reduction to be obtained. In practice, however, it is found that a fine, uniform particle size distribution aggravates the tendency toward bogging. On the other hand, it might also be expected that certain advantages could be attained in the actual grinding operation if the ore approached a normal random size distribution. This is not so, however; instead, there is an even more pronounced tendency toward bogging than occurs in the case of providing a fine, uniform particle size distribution.

These problems present a dilemma for it would appear that essentially every desirable condition which may be expected to facilitate or improve the process intensifies the problem of bogging.

The present invention, despite all these and other difficulties, however, has for its primary objective a solution to the problem of bogging. In particular, its prime object is to provide the art with a simplified, new, and improved fluidized iron ore reduction process wherein bogging is suppressed and, at certain conditions of operation, virtually eliminated so that more elevated process temperatures can be used and operation conducted more effectively for longer periods. An object also is to provide such process wherein oxidic iron ores are successively treated with a reducing gas, or gases, in a series of staged reaction zones to reduce the iron oxides to lower stages of oxidation, and to metallic iron. An even more particular object is to provide a process employing a series of staged reaction zones at different elevated temperatures wherein hydrogen gas, or a gas containing significant portions of hydrogen, can be used as the reducing gas, while the tendency toward bogging is suppressed, or eliminated. A yet further particular object is to provide a process wherein bogging within a ferrous reduction zone, or zones, is inhibited, or eliminated, even when hydrogen, or hydrogen containing gases, is used in the reduction.

Surprisingly, it has been discovered that these and other objects can be achieved in accordance with the present invention which contemplates maintaining within a fluidized iron ore reduction bed, or zone, from about 5 to about 60 weight percent of a fines concentration ranging from about $\frac{1}{10}$ to about $\frac{1}{3}$, and preferably from about $\frac{1}{5}$ to about $\frac{1}{4}$, of the average mean particle size of the total of the particles constituting the fluidized bed. If less than such range of concentration of fines is maintained within the bed, in relation to the average mean particle size, the bed becomes turbulent and efficiency is drastically reduced. Operation becomes impractical. On the other hand, if substantially higher uniformity of particle sizes or a greater concentration of fines are provides, the bed defluidizes or bogs.

The particles generally range in size from about two microns to about 5000 microns, and "fines" denotes particles which will pass through a standard 325 mesh Tyler screen. A preferred particle size distribution of iron oxides solids particles is one ranging from about 4699 microns (4 mesh) to about 2 microns, and the fines within such distribution, preferably, range from about 2 microns to about 44 microns (325 mesh). Preferably, the average mean particle size of the ore employed should range between about 35 and about 100 mesh, and more preferably from about 48 to about 65 mesh.

Concentrations of fines ranging from about 5 to about 20 weight percent of the total distribution of particle sizes is particularly effective in processes wherein the fluidized iron ore reduction process utilizes a single reduction zone or no more than a duality of stages. Up to about 30 percent fines have been employed successfuly under certain ideal conditions, however, where the reaction was not staged; and, up to 40 percent fines have been used in certain instances where two stages were provided, and bogging did not occur. Where the number of stages does not exceed two, however, significantly greater concentrations of fines produce bogging, and bogging can occur when greater than a 20 percent concentration of fines is employed.

Where three or more reduction stages are employed, it is preferable to increase the fines concentration to the process, and it can be increased up to as high as about 60 weight percent and the process operated satisfactorily. Where not more than three stages are employed, however, it is preferable not to exceed 50 percent fines. Concentrations ranging from about 10 to about 35 weight percent provide optimum results when three or more reduction stages are employed. This particular and higher level of fines, i.e., 10–35 percent, is especially effective in increasing gas efficiency and gas utilization when the ferrous reduction zone, or zones, is operated at very high metallizations, at narrow ranges of particle age distribution, and at high temperatures. Thus, bogging does not occur in a ferrous reduction zone even when metallization (percent metallic iron in the fluidized ore) is on the order of 70 to 90 percent, and higher, and even when the temperatures range as great as, and even greater than, about 1200° F. This is so even when hydrogen gas is employed as a major portion of the reducing gas. In fact, when hydrogen is not a major portion of the reducing gas, temperatures can range as high as about 1500° F. without significant loss of gas efficiency and gas utilization.

The average mean particle size is defined as the size of a particle at which point there is 50 weight percent of solids particles of lesser size and 50 weight percent of solids of greater particle size. Moreover, this relationship holds whether there is a wide size distribution or a narrow size distribution of the particles. A relatively narrow size distribution—viz., from about 4 to about 400 mesh—however, is greatly preferred. This size distribution produces optimum gas utilization and maximizes reduction, and the process is operated without bogging. Within the range of particle sizes a distribution is preferable which can be plotted logarithmically as a straight line when size in microns is plotted against cumulative weight percent. This curve can, however, be skewed to some extent at either end of the plotted curve.

In the reduction of oxidic iron ores in accordance with the best practice of this invention, the superficial velocity of the fluidizing gases is provided such that a substantial portion of the fines normally generated by decrepitation is entrained and removed from the process to prevent overaccumulation. These fines are recycled to the process in sufficient quantity to maintain the desirable range of critical concentrations and proper particle size distribution. Fines are preferably removed from the top of the bed where, due to elutriation, the fines are in higher concentration. The actual concentration of fines in the fluid bed at any time can be ascertained and readily controlled by pressure or density measurements of the fluidized bed at different levels in the bed.

The apparent density of a properly fluidized bed of partially reduced iron ores generally ranges between about 50 and 130 lbs./ft.$^3$, depending upon the gas velocity, which can range from about 1 to about 5 feet per second, but preferably from about 2 to about 4 feet per second. Pursuant to this invention, optimum gas solids contacting, metallization, and gas utilization can be obtained under particular fluidizing gas reaction conditions. Further, minimum residence times are provided and there is less equipment expense.

It is hypothesized that the duality or critical relationship between these critical ranges of concentrations of fines and the ratio of fines to absolute particle size distribution provides these outstanding benefits due to a lessening of contact surfaces between the individual ore particles. Thus, increase in temperature increases reaction rate, but it also increases crystalline iron or nodule formation on the particle surfaces. This increases the number of possible points of contact between the nodules of the individual particles and therefore intensifies the tendency of the ore to bog. As metallization increases, an increased tendency for the ore to bog occurs because of the greater concentration and proximity of particles with active sites for possible attachment one to another. Very high uniformity of particle size, or too many fines, also increases the bogging tendency because of an increased surface effect which increases the points of possible contact between the nodules of the particles. At the other extremity, however, too great a size difference between particles even more severely increases the tendency toward bogging. This is believed so because the smaller particles actually fill and pack the voids between larger particles resulting in an actual increase of surface contact between particles. On the one hand, then, too much fineness is undesirable, or, on the other hand, too much coarseness is also undesirable. Only where there is an optimum balance between fines and the coarser particles, as in the present invention, is there a tendency for the small particles to effectively lubricate the movement of the larger and coarser particles. Thus, some particle size disruption is necessary, essential, and indeed critical for eliminating the tendency for the sticking together of the particles and for the improvement of gas-solids contact, in accordance with this invention.

The invention will be better understood and is exemplified by reference to the attached drawings and to the detailed description which makes reference to these drawings.

In the figures:

FIGURE 1 is a schematic representation of one suitable form of physical equipment and involves a two-step, direct reduction method showing the withdrawal and separation of fines from an entrained solids off-gas and also the recycle of a portion of the fines to a reaction zone.

Figure 2:
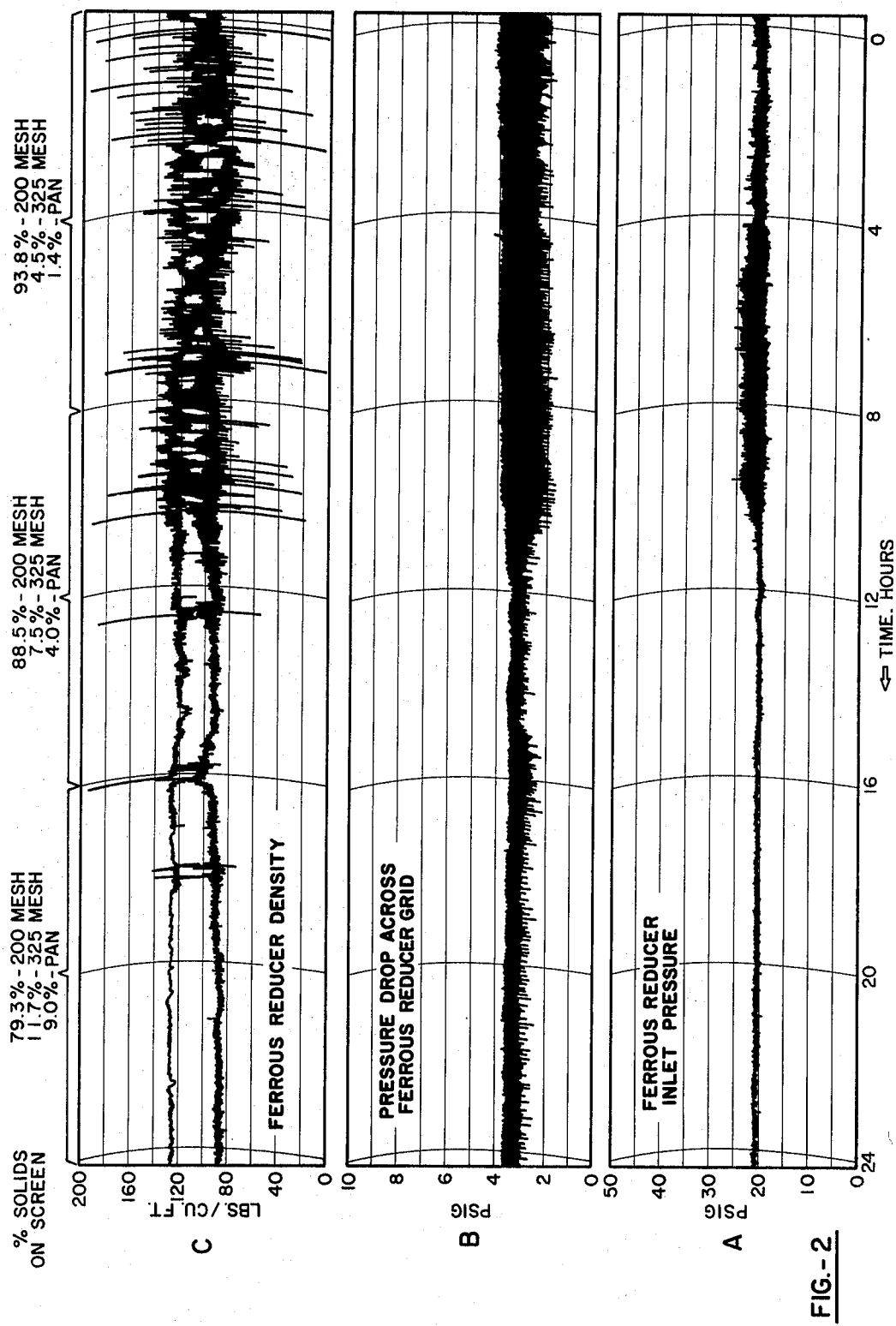

FIGURE 2 graphically illustrates the effect of fines concentration on fluidization by showing the effect on ferrous reducer inlet pressure, the pressure across ferrous reducer grid, and the apparent density of the solids in the ferrous reduced portion of a reactor. This figure is discussed in relationship with the working examples.

Referring to FIGURE 1 is shown a series of two reaction vessels 1, 2 which contain beds of particulate iron ore 3, 5 fluidized by contact with upwardly flowing reducing gas. Iron oxides consisting essentially of ferric oxide are continuously introduced into bed 3 of primary reactor 1 through line 7. In the reactor 1 the ore is reduced to an intermediate product which, though it consists substantially of ferrous oxide, also contains minor amounts of higher oxides and some metallic iron.

Ascending gas currents maintain beds 3, 5 in fluidized state. Reducing gas is introduced into reactor 1 through line 13 via a suitable gas distributor (not shown) wherein it fluidizes the solids of bed 3. The fluidizing gases in contact with the solids of bed 3 entrain the finer particles and carry these into chamber 4 where they are withdrawn through line 14 into cyclone separator 15. The entrained solids are therein separated from the gases and all or a portion thereof return through line 17 either to bed 3 or through line 18 and valve 19 to be removed from the reaction zone or fed to reactor 5 via line 20 and valve 22. Alternately, the fines can be fed through line 20 and valve 22 to line 23 wherein they are admixed with product withdrawn through line 9 and removed from the reactor.

The fines that are not recycled to the reactor can be subsequently treated, if necessary, in a separate zone to obtain the desired degree of reduction. Thus, it is generally advantageous to separately treat these fines rather than discard them, for the concentration of fines within the fluidized bed cannot be allowed to build up to an undesirably high level.

The partially reduced iron ore from bed 3 overflows into downcomer 8 and is introduced into bed 5 of reaction zone 2. The lever of the uppermost extension of downcomer 8 thus determines the level of fluid bed 3. Reducing gas from a suitable source is introduced through line 10 via a suitable gas distributor (not shown) wherein the gas fluidizes the solid particles and maintains a fluid bed 5 in this zone. The gases flow continuously upwardly and countercurrently to the flow of iron oxide. The necessary heat to carry out the endothermic reduction reactions can be supplied by conventional means, e.g., by preheating the iron oxide or reducing gas, or both.

In reactor 2, the ferrous oxide is reduced generally to 85 to 95 percent iron, which is then withdrawn through line 9 as product. The fluidized gases in bed 5 entrains finely divided particles, carrying these into chamber 6 wherein they are withdrawn through line 11 and fed to cyclone separator 12. In the separator 12 the fines are separated from the gas and returned to bed 5 through lines 21 and 20. The fines may even be admixed with fines already in line 20 and then returned to bed 5. If the concentration of fines present in bed 5 becomes too large, the fines can be diverted through line 23 and removed from the reaction zone with the product in line 9.

In the operation of such process, in accordance with this invention, certain conditions are generally employed. Thus, in primary reactor 1 the oxides are reduced substantially to ferrous oxide at temperatures ranging generally from about 1000° F. to about 1600° F., and preferably from about 1200° F. to about 1500° F. Generally, a pressure of from about 5 to about 150 p.s.i.g. is utilized and the average residence time of the fluidized solids is from about 6 to about 24 hours, but preferably from about 5 to about 10 hours. The superficial velocity of the gases ranges preferably from about 2 to about 4 feet per second.

The temperature of reactor 2 is generally maintained at least about 1000° F., and preferably from about 1200 to about 1600° F., or at a temperature insufficient to cause defluidization under the prevailing conditions. The pressure is maintained at from about 5 to about 160 p.s.i.g. The conditions of reduction, i.e., temperature, degree of metallization, fines concentration, and velocity of fluidizing gas of reactor 2, are much more critical herein than in reactor 1, since as the degree of metallization increases, the tendency for fines present in the fluidized bed to agglomerate and bog and defluidize the bed is far greater.

The fluidizing gas velocity of bed 5 is therefore preferably maintained at from about 2.5 to about 4.0 ft./sec. and there is provided an average residence time for the solids of bed 5 of from about 6 to about 24 hours. The upper temperature limit in this zone is particularly critical and is governed by the maximum temperature that does not cause particles to sinter or otherwise agglomerate. The sticking temperature varies with process conditions and with the type of ore, but under a specified set of process conditions the temperature can be elevated with the use of fines concentrations in relation to a given particle size distribution in accordance with this invention.

The fines concentration in beds 3, 5 is preferably maintained by density measurements in the beds and the fines recycle is adjusted to obtain the desirable bed density and fines concentration. A suitable bed density for carrying out the reduction reaction in bed 5 ranges generally from about 70 to 140 lbs./ft.$^3$, and preferably from about 80 to about 110 lbs./ft.$^3$. The fines concentration in bed 5 is maintained at a percentage of about 5 to about 20 percent, and preferably at from about 10 to about 15 percent. A suitable bed density for the optimum fines concentration is from about 85–100 lbs./ft.$^3$. By adjusting the percentage of fines recycled to beds 3, 5, the optimum gas-solids contacting can be obtained in both beds easily, efficiently and continuously, thereby obtaining optimum reduction of iron oxides to metallic iron for a prolonged period of operation.

It is also feasible, and in fact preferable, to provide greater number of stages of reduction along with increases in fines concentration. For example, one or a plurality of ferric reduction zones or one or a plurality of ferrous reduction zones, or both, can be employed. With the increasing number of stages, fines concentrations should preferably be increased. Conditions of temperature, pressure, degree of fluidization and the like within the different stages can be the same or different. In essentially all circumstances, the degree of reduction from one stage to the next is increased.

The invention will be better understood by reference to the following nonlimiting examples, demonstrating the more salient features of the invention.

To more vividly demonstrate the benefits of the present invention, the initial examples will, in fact, be specifically directed to the use of critical quantities and particular particle size distributions of fines employed within the ferrous reduction zone of the two-stage reduction process described, the ferrous reduction zone being that wherein bogging is the most severe. Moreover, gas containing major quantities of hydrogen is employed, this reducing gas tending to produce bogging far more rapidly than a synthesis gas consisting primarily of carbon monoxide without hydrogen.

Example 1

Reducing gas consisting essentially of 40 volume percent nitrogen and 60 volume percent of 90 percent purity hydrogen is directly and countercurrently contacted with a partially reduced iron ore consisting essentially of ferrous oxide. The reduction is carried out at a temperature of 1200° F. and a pressure of 20 p.s.i.a. The feed to the reducing operation is ground in an impact mill to provide the particle size distribution shown below:

Particle size, mesh: Percent
- 4 _____ --
- 14 _____ 21
- 28 _____ 16
- 48 _____ 14
- 100 _____ 14
- 200 _____ 13
- 325 _____ 12
- Pan (Finer than 325 Mesh) _____ 10

The range of particle sizes of the feed is thus shown to be 4 mesh to 325 mesh, or finer. The average means particle size of the particles in the bed is about 48–65 mesh. A bed having a diameter ⅛ the bed height is maintained by continuously feeding the iron ore to the bed and continuously withdrawing 85 percent metallized iron. The bed is fluidized by contact with reducing gas introduced therein at a superficial linear gas velocity of 3.25 ft./sec. Five hundred parts of fines are continuously withdrawn from the bed with the entrained gases and 410 parts of the fines are returned, this maintaining a fines concentration of from about 12–14 percent of particle size less than 325 mesh. The reaction proceeds smoothly and efficiently showing no tendency to bog.

When the foregoing example is repeated in exact detail, however, except that the fines concentration is reduced to about 4 percent fines, the bed becomes poorly fluidized, turbulent and rough. Very inefficient fluid solids contacting takes place.

When the example is again repeated in precise detail except the fines concentration is increased to slightly above 20 percent, the bed becomes unstable and efficient gas solids contacting rapidly deteriorates. The process then becomes entirely inoperative due to bogging.

Examples 2–4

The following tabulates further results, i.e., additional examples (Runs 3–5) and comparative demonstrations (Runs 2 and 6), as when fines concentrations are varied through and beyond the operable range. Conditions are the same as in the foregoing example except as otherwise indicated.

EFFECT OF FINES CONCENTRATION

| Run Number | 2 | 3 | 4 | 5 | 6 |
|---|---|---|---|---|---|
| Per Cent Solids, 325 Mesh or Less | 1 | 5 | 9 | 18 | 24 |
| Percent Metallization | (¹) | 67.5 | 80.0 | 96.5 | Bogged |
| Gas Utilization | | 41.2 | 55.0 | 59.4 | Bogged |

¹ Violent turbulent bed; though some reduction occurs, the process is entirely impractical.

Examples 5–8

The following tabulates yet another series of runs under conditions similar to the foregoing. In these instances, however, the temperature is considerably elevated—i.e., to 1390° F.—this being feasible because of a lessening of the amount of hydrogen contained in the reducing gas. Thus, the fluidizing gas contains 40 percent hydrogen (90 percent purity), 20 percent carbon monoxide, and 40 percent nitrogen. The results of these runs are set forth as examples (Runs 9–12) and demonstrations (Runs 7, 8, and 13) in the table below. It will be observed that gas utilization, i.e., percent of reducing gases actually utilized in reducing the oxides, is considerably improved because of the ability to operate at higher temperature without bogging. Also, a range of from about 9–12 percent fines appears about optimum.

EFFECT OF FINES CONCENTRATION

| Run Number | 7 | 8 | 9 | 10 | 11 | 12 | 13 |
|---|---|---|---|---|---|---|---|
| Per Cent Solids thru 325 Mesh | 1 | 3 | 5 | 9 | 9–12 | 18 | 24 |
| Percent Metallization | (¹) | (¹) | 70 | 80 | 90 | 91.5 | Bogged |
| Gas Utilization, percent | 40 | | 53 | 62 | 70+ | 75 | Bogged |

¹ At these conditions, violent, turbulent motion of the solids occurs, and the process becomes inoperative.

The following example and pertinent demonstrations show the use of an even greater concentration of fines, in accordance with this invention. Again the results are directed to elimination of bogging within a ferrous reduction zone. In these illustrations, a four-stage fluidized iron ore reduction process is employed.

Example 9

A large quantity of raw ore is pulverized in a ball mill, and divided into like portions. The sieve analysis of the ore is as follows:

Particle size, mesh: Percent
- 14 _____ 21
- 28 _____ 11
- 48 _____ 9
- 100 _____ 13
- 200 _____ 11
- 325 _____ 15
- Pan _____ 20

(Percent fines, 20)

A portion of the ore is charged into a fluidized iron ore reactor providing a series of four-stage fluidized zones, two ferric reduction zones, and two ferrous reduction zones. The ore is fluidized by an ascending gas initially 40 percent hydrogen, 20 percent carbon monoxide, and 40 percent nitrogen. The gas flows from a zone containing an iron ore at a lower level of oxidation to a zone wherein the ore is at the next higher level of oxidation, i.e., from the bottom to the top of the reactor. In the top ferric zone the gas is burned with air to provide heat for the reaction.

The ferrous reduction stages, wherein ferrous oxides are reduced to metallic iron, are operated at 1400° F. The ferrous oxide is reduced, in the first stage, to provide 27 percent metallization and, in the final stage, to produce 93 percent metallization.

From each ferrous reduction zone is withdrawn fines and a sufficient portion thereof is recycled to provide 39 percent and 26 percent fines in the first and final stages, respectively. Pursuant to such operation, gas utilization is on the order of 80 percent and there is no tendency towards bogging.

In sharp contrast, however, when the fines within the ferrous reduction zones are increased to slightly above 60 percent, the smooth operation is interrupted within only a few minutes. This interruption is characterized by an apparent loss of fluidization in the ferrous reduction zones, this being indicated by an apparent loss of density and level within the fluidized beds. Also, there is bypassing of the fluidizing gas and spreading of temperatures in the ferrous reduction zones. The bed is severely bogged within moments.

In FIGURE 2 of the drawings is shown the relationship between the density of the fluidized beds and the percent fines contained in the beds. As fines decrease below a desired level, the density of a bed, as manifested by measurement of pressure, becomes highly variable, this resulting in poor operation, poor gas utilization, and loss of operating efficiency.

Efficiency of fluidization is thus shown by reference to the graph designated A and B in the drawings. It is seen that at low fines concentration the variation in differential pressure drop across the fluid bed and the ferrous reducer grid is about 1 and 0.78 p.s.i.g., respectively, while a fines concentration of about 4 percent and greater is provided. Then, unexpectedly, these differential pressures increased to about 4 and 2 p.s.i.g., respectively, when fines concentration is reduced below about 4.0 percent.

Data designated as C of the drawing show the ferrous reducer density of the fluid bed undergoing reduction. At about 1.4 percent fines concentration, the apparent density of the ferrous bed varies violently at the points of measurement between about 0 and 200 lbs./cu. ft. Such rapid variations in density occurring in the bed indicate very inefficient fluids solids gas contacting and a violent, turbulent bed. This unfavorable condition continues up through a concentration of about 4 percent fines, after which concentration is exceeded, the bed suddenly quiets down and efficient fluidization is obtained. In this instance the density averages out between 80 to 90 lbs./ft.$^3$ and about 120 to 125 lbs./ft.$^3$, the two readings being taken at two different levels in the bed. At the measuring points, the density varies only by about 5 lbs./cu. ft. in the bottom of the bed and in the top of the bed as distinguished between violent density variations when less than 4 percent fines were present.

These data clearly show the criticality of the percentage of fines present in the fluid bed in obtaining efficient fluid solids gas contacting. The data also clearly show that even though a fluidized bed condition may be provided, an efficient solids gas contacting is not necessarily obtained.

The technique of the present invention consists primarily in maintaining the fines concentration in a bed of particles undergoing a fluidized reaction within critical limits whereby efficient fluidization, efficient gas solids contacting, gas utilization, and optimum reaction conditions can be obtained. This technique can be used in contacting any solids with any gases and has particular application to the reduction of iron ore. The technique could be used advantageously with any fluid solids contacting process and has particular application where fluid bed reaction zone processes are carried out and decrepitation of the coarse particles results in a net fines increase. Also, by measuring the density in the fluid bed, the amount of fines present in the bed can be readily ascertained and the amount of fines required to be recycled to the bed to maintain optimum fluidization conditions can be determined and the average fines concentration in the fluidized bed can be carefully controlled within the described limits. This technique can be used where particles of either narrow or wide size distribution are fluidized.

The critical concentration of fines used in accordance with the present invention and a technique for controlling the fines concentration is applicable to various metal oxides reduction processes which can be reduced in a fluid bed reaction zone. Although iron ore has been specifically described as the metal oxide being reduced, the invention is also applicable to the reduction of other metal oxides, metal sulfides, etc.

Other modifications and variations of the invention may be made without departing from the spirit and scope of the invention, and therefore only such limitations should be imposed as are indicated in the appended claims.

Having described the invention, what is claimed is:

1. In a process wherein iron oxides solids particles the average mean particle size of which ranges between about 35 and about 100 mesh are fluidized in a bed by contact of the particles with upwardly flowing gases and reduced, the improvement comprising controlling the particle size distribution and concentration of fines solids particles by withdrawing from the bed fines ranging in particle size from about ⅓ to ⅒ the average mean particle size of the total solids constituting the bed and recycling a sufficient amount of these fines to the bed to maintain the concentration thereof within the bed at from about 5–60 weight percent to provide greater efficiency of contact between gases and solids.

2. The process of claim 1 wherein the withdrawn fines range in size from about ¼ to ⅕ of the mean of the total fluidized solids particles constituting the bed.

3. In a process wherein iron oxides solids particles are suspended as a fluidized bed by contact of the particles with upwardly flowing reducing gases consisting essentially of hydrogen and from 0 to about 40 percent carbon monoxide, based on total gases, at a temperature ranging from about 1000–1600° F., the improvement comprising controlling the particle size distribution and concentration of the fines solids particles within sizes ranging from about 4 mesh to about minus 325 mesh while withdrawing particles of less than minus 325 mesh from said fluidized bed and recycling a sufficient amount of these fines particles to the fluidized bed to maintain the concentration thereof in said bed in quantity ranging from about 4–20 weight percent so as to provide greater efficiency of contact between gases and solids.

4. The process of claim 3 wherein said reducing gas consist essentially of hydrogen, the temperature ranges from about 1000–1200° F., and wherein the fines recycled to the bed are maintained in concentration ranging from about 9–12 weight percent.

5. The process of claim 3 wherein said reduction is conducted at a temperature ranging from about 1200–1600° F., the reducing gas consists essentially of a mixture of hydrogen and carbon monoxide in ratio of hydrogen to carbon monoxide ranging from about 1 to about 0.5, and wherein the fines recycled to the bed are maintained in concentration ranging from about 9–18 weight percent.

6. In an iron ore reduction process wherein iron oxides solids particles consisting essentially of ferrous oxide and metallic iron particles suspended as a fluidized bed by contact with upwardly flowing reducing gases consisting essentially of hydrogen from about 0 to 40 percent carbon monoxide, based on total gases, at temperatures ranging from about 1000 to about 1600° F., the improvement comprising controlling the particle size distribution and concentration of fines solids particles by maintaining said solids particles in random size distribution ranging from about 4 mesh to about minus 325 mesh and withdrawing particles ranging in size from about ⅓ to ⅒ of the mean particle size of the total particles constituting said fluidized bed and recycling a sufficient amount thereof to the bed to maintain the concentration of these particulate fines in the bed in quantity ranging from about 4–20 weight percent so as to provide greater efficiency of contact between gas and solids.

7. The process of claim 6 wherein the mean particle size of the bed ranges from about 35 to 60 mesh.

8. The process of claim 6 wherein the fines removed are of size less than about minus 325 mesh.

9. The process of claim 6 wherein the reducing gas consists essentially of hydrogen, the temperature ranges from about 1000–1200° F., and the concentration of the fines maintained within the fluidized bed ranges from about 9–12 weight percent.

10. The process of claim 6 wherein the reducing gas consists essentially of a mixture of hydrogen and carbon monoxide, the ratio of hydrogen to carbon monoxide ranges from about 1 to about 0.5, the temperature ranges from about 1200–1600° F., and wherein the concentration of solids particles maintained within the bed ranges from about 9–18 weight percent.

11. In a reaction stage of a process wherein ferrous oxides solids particles the average mean particle size of which ranges between about 35 and about 100 mesh are fluidized in a bed and metallized by contact of the particles with upwardly flowing gases and reduced, the improvement comprising maintaining the particle size distribution and concentration of the fines solids particles by withdrawing from the bed fines ranging in particle size from about $1/10$ to about $1/3$ the average mean particle size of the total solids constituting the ferrous bed and recycling a sufficient amount of these fines to the bed to maintain the concentration thereof at from about 5 to about 60 weight percent to suppress bogging and provide greater efficiency of contact between gases and solids.

12. The process of claim 11 wherein the withdrawn fines range in size from about $1/5$ to about $1/4$ of the average mean particle size of the total fluidized solids particles constituting the bed.

13. The process of claim 11 wherein the withdrawn fines have a particle size distribution ranging from about 4 to about 400 mesh and the average mean particle size ranges between about 35 and about 100 mesh.

14. In a reaction stage of a process wherein ferrous oxides solids particles are suspended as a fluidized bed by contact of the particles with ascending gases consisting of major proportions of hydrogen, at temperatures ranging from about 1200° F. to about 1600° F., to produce metallization, the improvement comprising maintaining the particles size distribution of the solids particles of the bed at from about 4 to about 400 mesh and the fines concentration of the solids particles at from about 10 to about 35 weight percent of the total solids particles of the bed by recycle of fines thereto to suppress bogging and to provide greater efficiency of contact between gases and solids.

15. The process of claim 14 wherein the said reducing gas consists essentially of hydrogen, carbon monoxide, and nitrogen, and the average mean particle size within the bed ranges from about 48 to about 65 mesh.

References Cited by the Examiner
UNITED STATES PATENTS

| | | | |
|---|---|---|---|
| 2,711,368 | 6/1955 | Lewis | 75—26 |
| 2,766,102 | 10/1956 | Lewis et al. | 75—9 |
| 2,848,316 | 8/1958 | Davis et al. | 75—26 |
| 2,947,620 | 8/1960 | Whitehouse et al. | 75—26 |
| 3,092,490 | 6/1963 | Ednie | 75—26 |
| 3,154,405 | 10/1964 | Engle et al. | 75—26 |

DAVID L. RECK, *Primary Examiner.*

BENAMIN HENKIN, *Examiner.*